Figure 1:
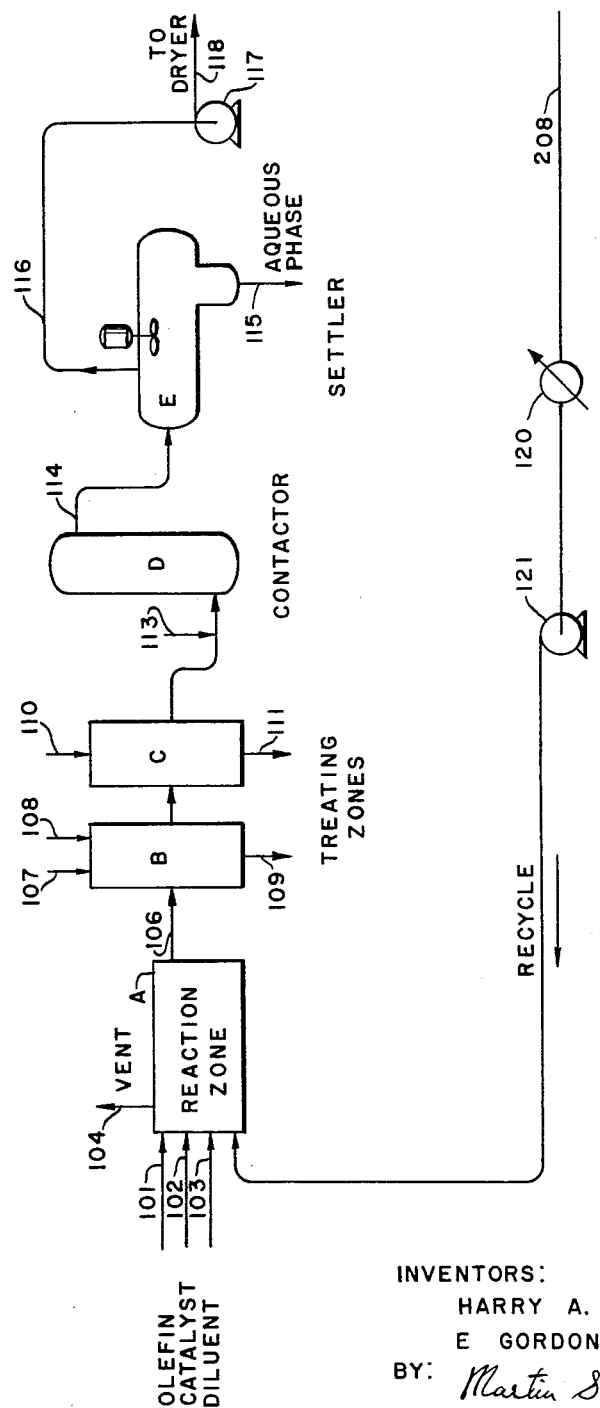

INVENTORS:
HARRY A. CHENEY
E GORDON FOSTER
BY: *Martin S. Baer*
THEIR ATTORNEY

United States Patent Office 3,040,015
Patented June 19, 1962

3,040,015
POLYOLEFIN RECOVERY PROCESS
Harry A. Cheney and E. Gordon Foster, Berkeley, Calif., assignors to Shell Oil Company, New York, N.Y., a corporation of Delaware
Filed Jan. 19, 1960, Ser. No. 3,458
3 Claims. (Cl. 260—93.7)

This invention relates to the low pressure polymerization of olefins. More particularly, it relates to an improved method for recovering polyolefin such as polyethylene or polypropylene from a slurry thereof in a non-aqueous solvent, such as is produced in low pressure polymerization processes.

It is now known that alpha-monoolefins can be polymerized at low temperatures and low pressure to produce polymer which is linear in structure. The methods for carrying out such polymerizations are generically referred to as "low pressure" methods and the polymer thus produced is termed "crystalline," "low pressure" or "linear" polymer. Low pressure polymer is produced by employing any of a variety of catalysts, including "Ziegler type" catalysts.

Among the low pressure polymers, polyethylene and polypropylene have achieved substantial commercial importance. It is known that other useful polymers can also be made by the same methods. In the interest of simplicity and clarity, the description of this invention for the most part will be confined to a discussion of propylene polymerization. Various modifications of apparatus and processing conditions will be pointed out, but the invention is not confined to such descriptive matter, as will be understood by persons skilled in the art.

Polypropylene is a particularly useful linear low pressure polymer. So far as is known, the commercial production of polypropylene has, to date, been carried out only in batch reaction systems. In such a system, propylene is gradually introduced into a liquid slurry of suitable catalyst in hydrocarbon liquid; propylene addition is continued until a relatively thick slurry of polypropylene solids in hydrocarbon liquid is obtained; the catalyst is destroyed by addition of a suitable compound; the reactor is opened; and the solid polypropylene is removed, separated and purified.

A fully integrated, continuous process for the polymerization of alpha-monoolefins such as propylene, using a low pressure catalyst system of the Ziegler type, has recently been devised and is described in co-pending patent application Serial No. 780,985, filed December 17, 1958 and now abandoned. So much of the description of the process therein as has to do with the preparation of catalyst and reactants, carrying out the polymerization reaction itself and treating the polymerization product, up to the point at which there is provided a slurry of polyolefin in a non-aqueous solvent which is ready for solvent removal, is applicable to the production and recovery of polyolefins according to this invention. These earlier process steps will be described herein only briefly. For details thereof, reference can be made to said co-pending patent application.

The present invention provides an improved method for simple and easy recovery of substantially dry polyolefin from a slurry thereof in non-aqueous solvents, such as is produced in low pressure polymerization. A person faced with the problem of drying such a slurry will find that a number of different drying methods are known to the chemical engineering art. These are well summarized, for example, "The Chemical Engineers' Handbook," edited by John H. Perry, 3rd edition, pages 872–3, Table 33. For the conversion of liquids to solids, the following commercial methods are listed: (1) spray drying, which is suitable for large scale operation; (2) vacuum freezing, which is expensive and generally used only for pharmaceuticals; (3) pan drying, which is suitable for small batches; and (4) drum drying, in which the liquid is dried on the outside surface of a rotating drum. This may have high maintenance costs. As suitable for the drying of slurries there are listed: (1) tray drying, for small scale operation; (2) vacuum rotary drying, for special cases; (3) pneumatic conveyors, in which the slurried solid is injected into a flowing stream of air and product is recirculated continuously; (4) spray drying for large scale operation; (5) drum drying; (6) vacuum freezing; and (7) pan drying.

In selecting a suitable drying method for the polyolefin-solvent system, one of the limitations to be considered is that the system exists at an elevated pressure, typically in the range between 50 and 500 p.s.i. Although this is a relatively low pressure as compared to the 10,000 and 20,000 p.s.i. or more employed in the prior, so-called "high-pressure" olefin polymerization processes, it is nevertheless a very substantial pressure which creates difficulties and expense in providing a suitable drying method. The method that ordinarily would be selected by the chemical engineer for use in a system such as the present is spray drying. It was found, however, that no commercial equipment is available in which polyolefin slurries could be spray dried, largely because of the high pressure at which the process is required to operate. Although it is possible that suitable spray drying equipment could be built, it would be relatively expensive to construct and operate. The other above-mentioned drying methods are either impractical for large scale operations of this kind or suffer from similar drawbacks of expensive construction and operation at the required pressures. Although it would be possible to overcome the pressure limitation by reducing the pressure of the slurry to a low value prior to the drying step, e.g., to atmospheric pressure, this is generally uneconomical because it would necessitate recompressing in expensive compressors the substantial amount of solvent and olefin associated with the slurry.

It is an object of this invention to provide a simple, economical method for the recovery of substantially dry polyolefin from polyolefin slurries produced in low pressure polymerization of alpha-monoolefins. It is a specific object to provide a suitable method for the recovery of polypropylene from slurries in hydrocarbon solvents such as propane, isopentane, and the like, as produced in low pressure polymerization using a Ziegler type catalyst. Other objects will become apparent as the description of the invention proceeds.

It has now been found that slurries of polyolefins in hydrocarbon solvents such as produced in the Ziegler type low pressure polymerization process are adapted to be dried even at pressures of several hundred pounds per square inch by a surprisingly simple, easily operated, inexpensive method. The method of this invention comprises passing the slurry at a moderate velocity into an externally heated conduit in which the liquid component of the slurry is evaporated, resulting in a suspension of substantially dry polyolefin in a vapor stream which flows at a relatively high velocity, and passing the suspension into a solid removal device, such as a cyclone, wherein the polyolefin is separated as powdered solid while a vapor stream is removed for recovery and reuse if desired. It has also been found that in order to permit the continuous operation of this simple drying system, a suitable apparatus is required for removing the powdered solid, which is still at a substantial pressure, e.g., 250 p.s.i., from the cyclone vessel or the like in which it is recovered to containers existing at atmospheric pressure.

A specific apparatus and method for doing this will be described hereinafter.

Figure 2:
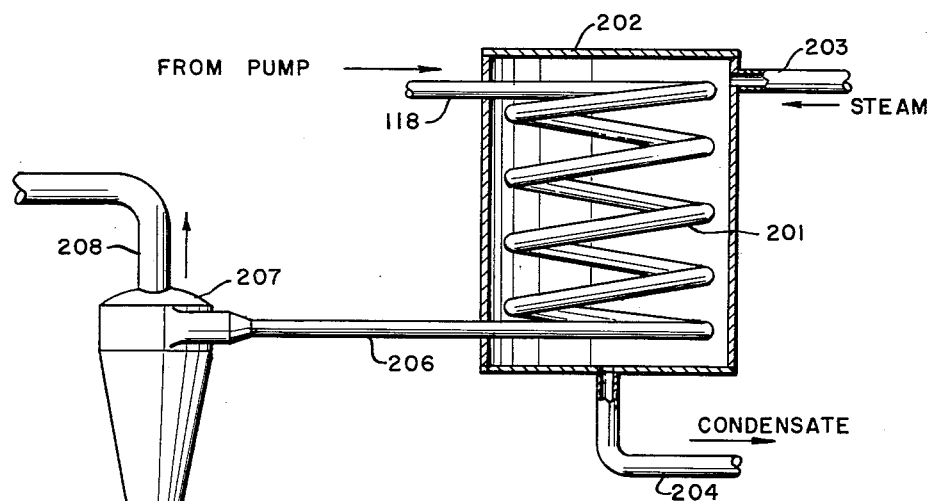
Figure 3:
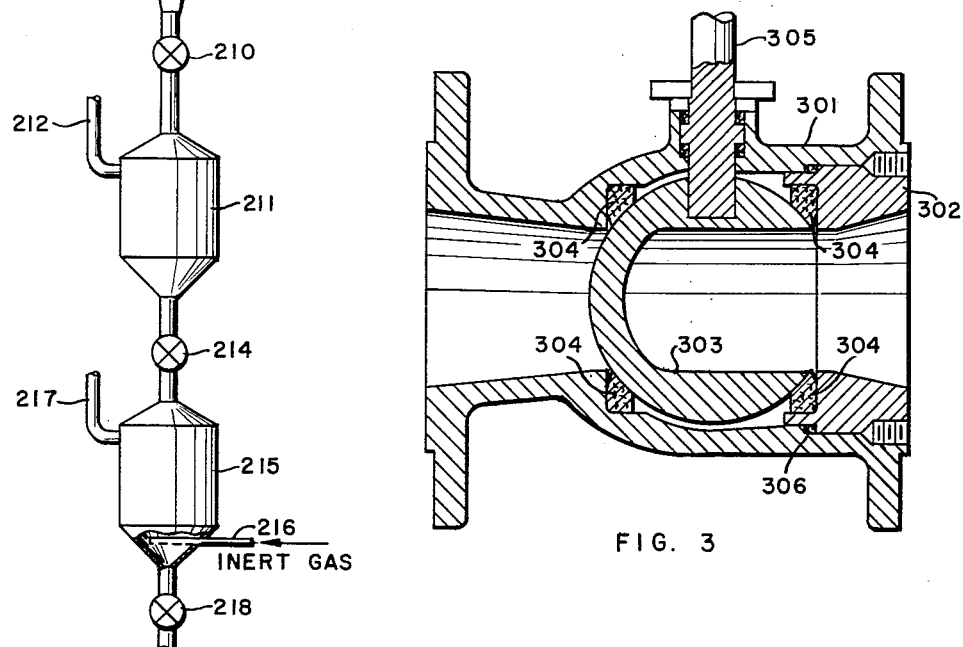

The invention will be further described by reference to the drawing, wherein FIG. 1 is a schematic flow diagram of a typical process for low pressure polymerization of an olefin and workup of the slurry, up to the point of solvent removal;

FIG. 2 is a drawing of an apparatus suitable for carrying out the process of this invention; and FIG. 3 is a detail showing the powder removal valve used in FIG. 2.

A typical process for the low pressure polymerization of propylene, such as is described in more detail in Serial No. 780,985, is illustrated by reference to FIG. 1. Reaction zone A, which is schematically represented, may contain one or a multiple number of suitable reactors connected in parallel or in series, together with other associated auxiliary equipment. Treating zones B and C may each contain suitable equipment, such as for example, a contactor and settler as illustrated by contactor D and settler E, representing the last treating zone shown. In a typical process for production of polypropylene, a suitable propylene stream (fresh feed) enters the reactor through line 101, and a propylene-containing recycle stream through line 208. These may, of course, be combined ahead of the reactor. Catalyst is added through line 102 and diluent through line 103. Commercial propylene is readily available as a component of propylene-propane mixtures containing typically from 40 to 70% propylene. Propane acts as a diluent in the polymerization process. It is sometimes desired to use propane as the sole diluent. At other times inert solvents, preferably hydrocarbon solvents, are employed as diluents, e.g., butane, pentane, isopentane, heptane, octane, or other relatively low-boiling liquid hydrocarbons. In the process according to this invention, the diluent is one which boils at a relatively low temperature, e.g., not above about 300° F. at the pressure prevailing in the slurry drying system. The ratio of propylene to total diluent, including propane, entering the reaction zone in a continuous operation is suitably in the range from about 10 to about 75 mole percent, with about 15 to 40% being preferred. These values refer to the combined fresh feed and recycle streams.

Special care is usually taken to provide a feed of very high purity, i.e., free from contaminating material such as water and oxygen and compounds which destroy catalyst.

The feed stream may also contain various additives that have particular functions relating to the control of the polymer quality. The utility of a number of such additives is known. A particularly advantageous one is hydrogen gas, which assists in controlling the molecular weight of the polymer produced in the polymerization.

The catalyst is usually a finely divided solid which is added in the form of a slurry. A certain few catalyst compositions are particularly suitable in the low pressure methods because they produce high yields of polymer which have higher proportions of crystallinity, in addition to which the molecular weight may be controlled as desired. Suitable low pressure catalysts are represented by those that are prepared from at least two components within one of Groups A and B as follows:

A. The reaction product of (1) a compound of a transition metal selected from Groups IVa, Va, and VIa, i.e., the left hand subgroups of Groups IV, V and VI, of the Mendeleev Periodic Table, as illustrated on page 28, of Ephraim; "Inorganic Chemistry," 6th English Edition, and manganese with (2) a compound of the formula $R_1R_2AlX$, or $R_1AlX_2$ and mixtures thereof, wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan, thiophenol, carboxylic acid and sulfonic acid.

B. The reaction product of (1) a compound of a transition metal from Groups IVa, Va, and VIa of the Mendeleev Periodic Table and manganese with (2) a compound selected from the group consisting of aluminum trialkyl, magnesium alkyl, zinc alkyl and Grignard compound.

Particularly preferred catalysts are those selected from the reaction product of a Group IVa metal halide such as zirconium trichloride, titanium trichloride, and the like; and an aluminum alkyl, including aluminum alkyl halides or mixtures thereof, with the last being more preferred. Representative aluminum alkyls include, for example, aluminum diethyl chloride, aluminum diethyl bromide, aluminum triethyl, aluminum triisobutyl, aluminum triisopropyl, aluminum ethyl sesquichloride and others wherein the alkyl radicals have from one to ten carbon atoms, as aluminum trinonyl, and the like. In general, low pressure catalysts are said to include the reaction product of a compound of a Group IV—VI transition metal and a strong reducing agent.

The pressure maintained in the polymerization reactors is preferably the autogenic pressure, i.e., the pressure resulting from the selected reactant composition and temperature. It is generally in the range from about 50 to 500 p.s.i.a. with pressures of the order of about 100 to 300 p.s.i.a. being especially preferred. Higher pressures, i.e., over 500 p.s.i.a. may be employed but are generally not recommended because they increase the hazards and expenditures of capital required to provide the reactor without corresponding improvement to the process. The polymerization reaction is exothermic so that heat is liberated in the reactor during the course of the reaction. Heat removal may be supplied by indirect cooling means or by direct cooling due to evaporation of part of the solvent from the reaction mixture, or by both direct and indirect cooling. It is preferred to supply a substantial amount of heat removal in the form of evaporative cooling. Reaction zone A may contain suitable means for recovering, compressing, purifying, and returning evaporated solvents to the reactors. Inert gases, e.g., excess hydrogen, may be removed by a line 104.

Temperatures in the reactors are suitably in the range from 75° to 250° F., but preferably of the order of 100° to 175° F. Temperatures of about 120° F. are especially preferred in the production of polypropylene.

In a continuous process, 5 to 80% of the propylene in the feed is converted to polypropylene in one pass through the total reaction zone A. The total reaction mixture leaving the reaction zone as a slurry generally contains 5—35% polymer and 5—40% monomer, the remainder being diluent. The slurry of polypropylene in inert diluent, withdrawn through line 106, is held to a maximum of about 35% of solids in order to avoid difficulties in pumping and handling. It is generally preferred to have a solids content of about 20% or less by weight. Solids contents as low as 5% by weight may be used, but will involve higher process cost in solvent recovery. The solid polypropylene is present in the slurry in the form of small particles, the preponderant proportion of which, e.g., about 80%, has diameters less than 50 microns. A typical particle size distribution, determined by a wet screen method on polypropylene recovered in accordance with this invention, is as follows.

| Size, microns: | Percent, finer than— |
|---|---|
| 150 | 99.5 |
| 100 | 95.5 |
| 90 | 94.2 |
| 80 | 92.2 |
| 70 | 89.8 |
| 60 | 86.1 |
| 50 | 81.0 |
| 40 | 73.8 |
| 30 | 62.0 |
| 20 | 44.0 |
| 10 | 17.5 |

The slurry leaving the reaction zone still contains ingredients of the active catalyst. It enters treating zone B, in which there is continuously added through line 107 a polar liquid that reacts with the catalyst contained in admixture in the polymer slurry. Suitable polar liquids are methanol, ethanol, propanol, isopropanol, butanol, acetone or the like, with the lower alcohols being preferred. The polar liquid used to decompose the catalyst preferably is anhydrous or substantially anhydrous. A strong mineral acid such as hydrochloric acid may also be added in the same mixing vessel, suitably as anhydrous acid dissolved in the polar liquid, or it may be added as aqueous acid in a separate subsequent vessel in this treating zone via line 108. The temperature prevailing in treating zone B is suitably between 100 and 160° F. Following the mixing zone or zones, there is a settling zone in which the remaining aqueous phase is removed via line 109. The treated slurry then passes from treating zone B to treating zone C, in which it is washed with dilute aqueous acid, e.g., 0.1% HCl, via line 110. A wash with dilute iron-complexing solution, e.g., 0.1% oxalic acid, may be included in zone C. Spent wash water is removed via line 111. The washed slurry passes to treating zone D wherein it may be contacted with additional water, added through line 113, which serves to remove residual amounts of acid. The above-described treatments and washes may be carried out at temperatures from 50° to 250° F., elevated temperatures of about 130° to 150° F. being especially preferred.

In a typical treating zone such as illustrated by contactor D and settler E the treating liquid, e.g., water, may be added to the slurry prior to entering the contacting vessel such as through line 113. The contacting vessel may be equipped with an agitator (not shown) to obtain intimate and efficient agitation in the wash vessel. Overflow slurry containing solvent, solid polypropylene, and water passes through line 114 to settler E. The settler may be equipped with an agitator, as shown, which rotates gently in the upper layer only so as to maintain the solid polypropylene in suspension therein. If desired, the settler may contain a partial baffle (not shown) at the interface of the two liquids to aid phase separation. The aqueous phase is removed from the boot via line 115 while the slurry passes through overflow line 116 to pump 117 and line 118 into the drier illustrated in FIG. 2. At this point, the slurry still contains approximately the same proportion of liquid hydrocarbon and solid polypropylene as it did when it left the reaction zone A and is generally at a pressure in the range from 50 to 500 p.s.i.

Turning now to FIG. 2, there is illustrated a drying and solids recovery apparatus such as has been employed in an operation of the process of this invention on a semicommercial scale. This apparatus is shown for purposes of illustration only. It will be realized that substantially different forms of equipment may be employed in carrying out the process of this invention. Briefly stated, this portion of the process consists in passing the slurry from treating zone E, at the same elevated pressure, as a confined stream along an elongated path in a heating zone whereby its liquid content is vaporized and it is converted into a suspension of solid polymer particles in the resulting vapor, discharging said suspension into a solids separating zone and recovering powdered solid polyolefin from said separating zone. A slurry of polypropylene in a mixture of propane and isopentane, for example, is passed by pump 117 of FIG. 1 through line 118 into the drying section. The drier in this case consists simply of a helical coil made from 100 feet of ⅝-inch diameter tubing capable of resisting pressures up to about 500 p.s.i. The coil is surrounded by a heating chamber which, in this instance, is simply a 50 gallon oil drum into which has been welded a steam inlet pipe 203 and an outlet pipe 204 to carry off steam condensate. As the slurry passes from line 118 into coil 201 it is heated and the liquid hydrocarbon components of the slurry are vaporized, resulting in a flow of dry powder in a vapor stream which has a substantially greater velocity than the velocity at which the liquid enters the coil.

The temperature in the heating chamber is preferably and most conveniently that of saturated atmospheric steam, i.e., 212° F. This results in wall temperatures of about 212° F. for the coil, and a typical coil outlet temperature of about 192±2° F. The temperature of the heating chamber must be at least above the boiling point of the liquid in the slurry. It should also be below the softening point of the solid polyolefin, preferably at least 20° below the softening point.

The flowing mixture of vapor and powder passes out of the coil through line 206 into cyclone 207, which is a conventional piece of equipment serving to separate the powdery solids from the vapors in the stream entering it. The vapors leave cyclone 207 via line 208 while the powder collects in the conical bottom section of the cyclone vessel.

The pressure drop in coil 201 is typically about 50 p.s.i. The pressure in cyclone 207 is about the same as that at the outlet of coil 201. Hence, the vapors removed via line 208 are at a sufficiently high pressure so that they are readily condensed in condenser 120, and pumped back by means of pump 121 to reaction zone A, as shown in FIG. 1.

There remains the problem of removing the dry powdery solid polypropylene from the bottom of the cyclone to permit continuous operation. It was found that commercially available pressure lock valves, such, as for example, the conventional star valves, are inadequate for this service. They are, as a rule, not designed for pressure drops of over 5 or 10 p.s.i. It was ultimately discovered that a simple and useful pressure lock valve, suitable for intermittent removal of powder from the cyclone, can be made by modifying a conventional double seal ball valve. The latter is a valve in which the orifice is provided by a movable ball containing a channel whose axis is in the same plane as that of the valve openings and connected pipe, and whose diameter is nearly as large as that of the connected pipe. A quarter turn of the ball changes the valve from a fully opened to a fully closed position. For the instant service, such a valve was modified by replacing the ball which contained the channel by one which had one end of the ball completely closed, so that it contained a cup, rather than a channel. The pin which limits rotation of the valve handle was removed so that the ball could be rotated through 360°. In this manner, continual rotation of the ball from a position in which the open end is up to a position in which the open end is down provides a means for removal of solid polymer from the bottom of the cyclone vessel through valve 210 into vessel 211.

Valve 210 may be periodically operated by hand. However, it is much preferred to have the valve continuously turned by a suitable motor. The turning rate may vary over a wide range, from as little as 1 r.p.m. or less to 100 r.p.m. or more. The range from 1 to 5 r.p.m. is suitable.

Although the powder may be let down from the cyclone directly into a single storage vessel maintained, for example, at about atmospheric pressure, it is preferred to use the arrangement illustrated in FIG. 2, in which the powder is let down from cyclone 207 via valve 210 into vessel 211 which is maintained at a relatively lower superatmospheric pressure, e.g., one fifth of the pressure in the cyclone. Vapors of solvent and olefin associated with the powder are released and withdrawn via line 212, to be recompressed and reused in the process. Powder is subsequently removed from vessel 211 via a valve 214, similar in construction to valve 210, into atmospheric storage vessel 215. A small stream of an inert gas, e.g., nitrogen, is passed into the bottom of this vessel via line 216 to remove remaining hydrocarbon vapors, mainly for reasons of safety. The gas mixture is withdrawn via line 217 and may be flared. Powdered solid may be withdrawn as desired from vessel 215 via valve 218.

Valve 210 is shown in detail in FIG. 3. The valve consists of a valve body 301 containing a body insert 302 which may be made of the same or different material. The operative part of the valve is ball 303, which contains a cup-shaped opening, as shown. Valve seats 304 are provided at the inlet and outlet side of the ball. The ball is turned by means of stem 305 which is provided with a suitable handle and is sealed in the conventional manner as shown. An additional seal 306 is provided for the body insert. Conventional valves of the illustrated type can be obtained, for example, from the Jamesbury Corporation. These valves are easily modified by replacing the ball which contains a channel by one which is closed at one end, as illustrated.

Illustrative of the simplicity of the system of this invention for the production of a polyolefin on a commercial scale are the following approximate values for a system which permits the production of 30 tons per day of solid polypropylene. This much polypropylene can be suitably recovered by pumping into the drying system 17,000 pounds per hour of a slurry containing about 15% by weight of solid polypropylene in 80% propane and 20% propylene. The drying section consists of 200 feet of 2 inch diameter pipe, heated by saturated steam in a suitable manner, e.g., by surrounding the pipe with an annulus into which steam is fed. The slurry enters the drying section at a liquid velocity of about 10 ft./sec. and is converted into a vapor-powder mixture which leaves the drying section at a velocity of about 100 ft./sec. The inlet pressure is 280 p.s.i. and the outlet pressure is 260 p.s.i. The suspension of polypropylene and vapor passes into a conventional cyclone vessel which is provided with a 6 inch dumping valve of the type described.

Many changes can be made in the form of the specific apparatus and conditions illustrated within the scope of this invention. For example, the confined path in which the slurry is heated and liquid vaporized therefrom may be in the form of multiple passages surrounded by a heating chamber, e.g., a number of tubes operated in parallel, provided that each tube is long enough to permit complete vaporization of liquid entering the tube. The heated tubes may be disposed vertically, horizontally, or at an angle.

Extremely high velocities are not essential in the heated tubes in operations according to this process. The velocity of the liquid entering the tube may be, for example, in the range from 0.5 to 15 ft./sec. The velocity of the vaporized stream need only be sufficient to be above that at which bridging of the solids in the heated tube may occur. This is a function of the geometry of the design; velocities of at least about 10 ft./sec. are generally sufficient. The critical point in each tube is that at which most of the liquid has just evaporated. This results in an increase in the viscosity of remaining slurry.

It will be understood that in the production of polypropylene or similar polyolefin, 100 percent removal of hydrocarbon solvent from the powdered polyolefin is not required, since residual amounts of such hydrocarbons are readily removed in the conventional subsequent conversion of the powder to pellets, nibs, or the like by extrusion. It is sufficient that the powdery polyolefin be converted to a form which is substantially dry, i.e., in which there is no liquid present apart from the particles of polyolefin and insufficient liquid to cause the particles to adhere to each other. A small amount of solvent, e.g., 0.1 to 0.5%, is usually very tenaciously associated with the particles, e.g., by adsorption and by retention within particles. By the process of this invention, polypropylene is produced which contains generally no more than 0.5%, often no more than 0.1% solvent hydrocarbon. However, even contents of solvent up to 5% may be tolerated.

Variations may be made in the method of removing the recovered solids from the solids separation vessel. Although the illustrated method is preferred and has been found to be particularly suitable, alternative methods may be employed. For example, the solids may be withdrawn from the cyclone through a valve into a vessel serving as a pressure lock. When solids are drawn into this vessel, its pressure is the same or only slightly less than that in the cyclone. After a desired amount of solids has been withdrawn, the valve is then closed and the pressure lock vessel is depressurized to atmospheric pressure and the solids withdrawn therefrom. The vessel is then repressured with inert gas or hydrocarbon gas and a new portion of solids withdrawn into it from the cyclone.

These and other modifications of the process of this invention may be adopted without departing from the spirit of the invention.

We claim as our invention:

1. A method for recovering solid polyolefin produced by the polymerization of a monoolefin at conditions resulting in the production of a slurry of fine polyolefin particles in a liquid comprising essentially said monoolefin and inert hydrocarbon boiling below 300° F. at the pressure prevailing in the hereinafter referred to slurry drying system, which comprises passing said slurry, having a solids content between 5 and 35 percent by weight, at a pressure of at least about 50 p.s.i.a. into a drying system comprising a heating zone and a solids recovery zone, wherein said slurry passes as a confined stream along an elongated path in said heating zone, which is maintained at a temperature above the boiling point of said liquid at the prevailing pressure and at least about 20° F. below the softening point of said polyolefin, whereby the liquid content of said slurry is substantially completely vaporized and the slurry is converted into a suspension of substantially dry particles in the resulting vapor, discharging said suspension into said solids separating zone and recovering powdered solid polyolefin from said separating zone.

2. A method for recovering solid polypropylene produced by the polymerization of propylene in the presence of a low pressure polymerization catalyst at conditions resulting in the production of a slurry of fine polypropylene particles in a liquid comprising essentially propylene and inert hydrocarbon boiling below 300° F. at the pressure prevailing in the hereinafter referred to slurry drying system, which comprises passing said slurry, having a solids content between 5 and 35 percent by weight, at a pressure of at least about 50 p.s.i.a. into a drying system comprising a heating zone and a solids recovery zone, wherein said slurry passes as a confined stream along an elongated path in said heating zone, which is maintained at a temperature above the boiling point of said liquid at the prevailing pressure and at least about 20° F. below the softening point of said polypropylene, whereby the liquid content of said slurry is substantially completely vaporized and the slurry is converted into a suspension of substantially dry polypropylene particles in the resulting vapor, discharging said suspension into a cyclone vessel in said solids separating zone and recovering substantially dry powdered solid polypropylene from said separating zone.

3. A method for recovering solid polypropylene produced by the polymerization of propylene in a reaction zone in the presence of a low pressure polymerization catalyst at conditions resulting in the production of a slurry of fine polypropylene particles of which the preponderant portion has particle diameters of less than about 150 microns, in a liquid comprising essentially propylene and a hydrocarbon boiling below 212° F. at the pressure prevailing in the hereinafter referred to slurry drying system, which comprises passing said slurry, having a solids content between 5 and 35 percent by weight, at a pressure in the range from 50 to 500 p.s.i.a. into a drying system comprising a heating zone and a solids recovery zone, wherein said slurry passes as a confined stream along an elongated path in said heating zone which is maintained at about 212° F., whereby the liquid content of said slurry is substantially completely vaporized and the slurry is converted into a suspension of substantially dry polypropylene particles in the resulting vapor, discharging said suspension at said pressure minus the pressure drop in said path into a cyclone vessel in said solids recovery zone, withdrawing from said cyclone a vapor stream of propylene and inert hydrocarbon, condensing it without recompression and returning it to said reaction zone, and recovering from said cyclone substantially dry solid powdered polypropylene.

References Cited in the file of this patent

UNITED STATES PATENTS

| | | |
|---|---|---|
| 1,840,857 | Testrup et al. | Jan. 12, 1932 |
| 2,838,477 | Roelen et al. | June 10, 1958 |
| 2,845,414 | Schutze | July 29, 1958 |
| 2,858,902 | Cottle | Nov. 4, 1958 |
| 2,957,859 | Mertes | Oct. 25, 1960 |